May 10, 1955

G. R. HARRIS 2,707,940

VALVE MECHANISM

Filed July 17, 1953

Inventor
GEORGE R. HARRIS

By George V. Smyth

Attorney

United States Patent Office 2,707,940
Patented May 10, 1955

2,707,940

VALVE MECHANISM

George R. Harris, Los Angeles, Calif., assignor of one-third to Zoltan Faber and one-third to Nickolas Korda, both of Los Angeles, Calif.

Application July 17, 1953, Serial No. 368,570

8 Claims. (Cl. 121—150)

This invention relates to valve mechanisms and more particularly to a valve mechanism for controlling the operation of a fluid motor or cylinder.

The valve mechanism of the present invention is particularly adapted for use as a control means for a fluid motor or air cylinder of a swaying or rocking device forming a part of a lift of the type used by garages and filling stations in elevating motor vehicles undergoing lubrication. Although the valve mechanism is especially useful as such a control instrument it is not limited to that field of use as will be hereinafter understood.

In such field of use the valve mechanism controls the flow of air from a suitable source, such as a compressor and/or storage tank, to a fluid motor or cylinder assembly usually carried by the rails of the lift and used to remove the weight of the motor vehicle from the springs, shackles and other support elements of the vehicle. In one adjustment of the valve mechanism of the present invention, an automatic cycling of air flow to the fluid motor or cylinder assembly is produced to operate the latter intermittently to rock or sway the vehicle, while in another position of adjustment the valve admits air under pressure within the motor or cylinder assembly to lift and hold the weight of the motor vehicle from the springs and other normal support elements.

The valve mechanism of the present invention includes a cylinder member having a piston operating therein which controls the admission of air into and out of the cylinder and consequently movement of the piston itself. In one use of the mechanism the piston effects control of its own movement between alternate positions relative to the cylinder by intermittently closing and opening inlet and outlet ports for the motivating air. The piston in one of said positions closes the inlet port but is yet moved in the cylinder by the pressure exerted against the portion of the piston wall exposed to the pressure of the air throughout the extent of the inlet port.

Once the piston is moved under this pressure, air entering the cylinder flows through passages formed in the piston to be discharged into the fluid motor or cylinder assembly of the rocker or sway device. The pressure of the air now filling the system equalizes on opposite ends of the piston but as the area of one face of the piston is larger than the other face, the piston is returned in the cylinder to the position in which it is again closing the inlet port. In this position the piston acts to vent one side of the cylinder and the fluid motor to the atmosphere. The air pressure acting against the portion of the piston closing the inlet port again moves the piston in the cylinder to repeat the cycle of operation.

To bring about the variance of operation above mentioned, the valve mechanism includes an adjustable muffler which in one position prevents venting of one end of the cylinder and the fluid motor as the piston moves between its alternate positions. In this position of adjustment of the muffler, the valve mechanism merely acts to operate the fluid motor in the one phase of its actuation and will not automatically repeat the cycle of operation as above described.

Other features and advantages of the present invention will be apparent from the following description taken in connection with the accompanying drawing, in which Figure 1 is a sectional view of the valve mechanism of the present invention showing the piston thereof in one of its alternate positions within the cylinder;

Figure 1:
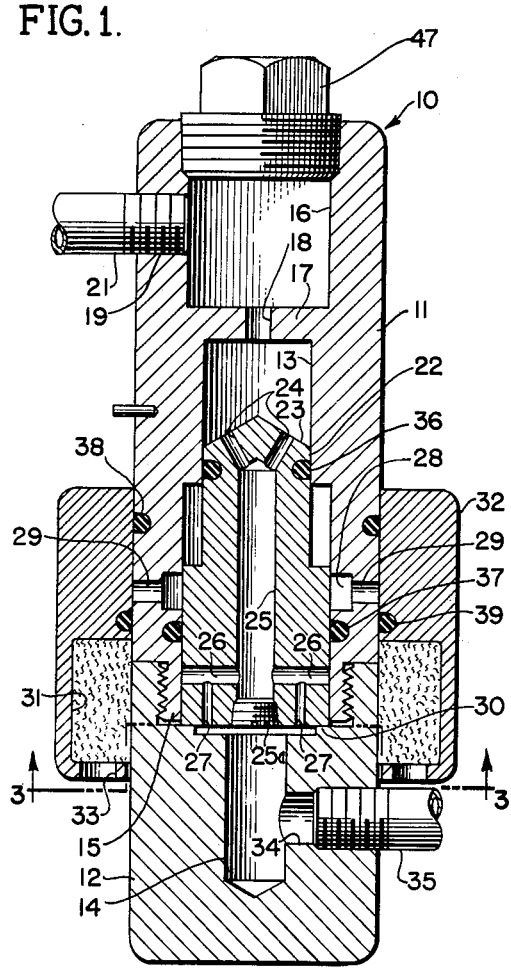

The valve mechanism of the present invention, referring now to the drawing, comprises a body member 10, formed of two sections 11 and 12. The section 11 is formed with a longitudinally extending bore 13 which forms the cylinder of the valve mechanism. The bore 13 is counter bored to present a larger diametered cylindrical wall surface for a purpose which will be hereinafter explained.

Figure 2:
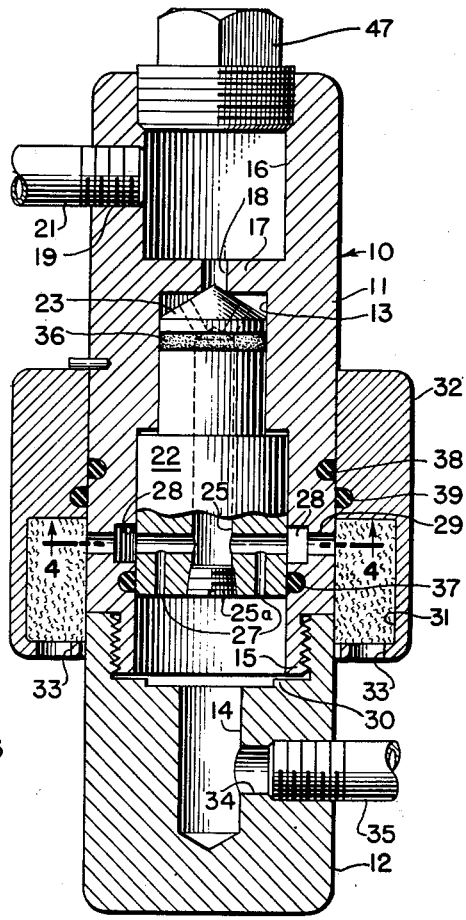
Figure 2 is a view similar to Figure 1, but showing the piston in the other of its alternate positions within the cylinder.
Figure 3:
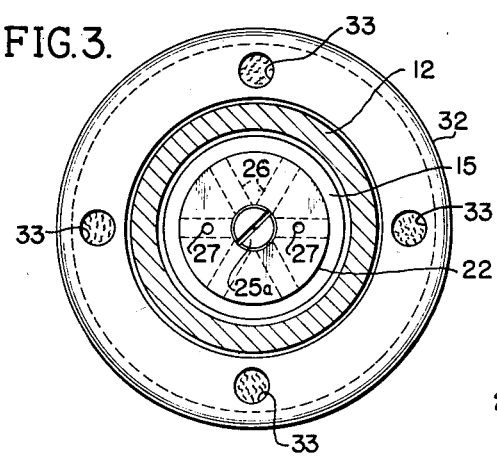
Figure 3 is a section taken along line 3—3 of Figure 1.
Figure 4:
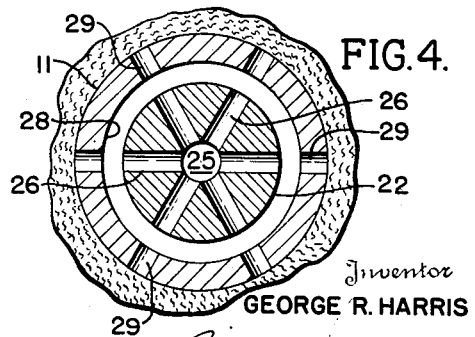
Figure 4 is a section taken along line 4—4 of Figure 2.

The section 12 is formed with a small blind bore 14 of a diameter less than the diameter of the bore 13, and which communicates with the latter when the sections 11 and 12 are connected to form the body member 10. As now preferred the sections are interconnected by threading an extension 15 of the section 11 into a tapped counter bore of the section 12. The shoulder formed by this counter bore, as best seen in Figure 2, forms the one end wall of the cylinder.

The body section 11 at the end opposite to the bore 13 is formed with a second bore 16 the opening of which is normally closed by a plug 47 threaded into the tapped wall of the bore. The bores 13 and 16 define a separating wall element 17 which is provided with a centrally located port 18 communicating the bores 16 and 13.

The wall of the body section 11 is formed with a laterally extending tapped opening 19 which communicates with bore 16. The tap bore 19 mounts the threaded end of a pipe or conduit 21 which leads to a source of compressed air, not shown.

The cylinder formed by the bore 13 of the body section 11 mounts a piston 22 the diameter of which is reduced adjacent the one end thereof to snugly fit the inner end of the bore 13 while the opposite end of the piston snugly fits the enlarged counter bore formed adjacent the inner end face of the body section 12. The smaller end face of the piston 22 is formed as a conical surface 23, the apex of which is concentric with the opening 18 communicating the bores 13 and 16 of the body section 11.

It will thus be seen that this conical end face of the piston 22 in the one position of the latter acts to close the opening 18 to the flow of air from the bore 16 into the cylinder formed by the bore 13. Leading inwardly from the conical face 23 are a pair of passages 24 which communicate with one end of a longitudinally extending passage 25 which is closed at the opposite end by a plug 25a. Formed in the large diametered end of the piston 22 are a plurality of lateral or radial passages 26 which communicate with the longitudinally extending passage 25. An aligned pair of these passages 26 also communicate with two smaller passages 27 leading from the end face of the piston 22.

The cylindrical wall surface of the counter bore of the body section 11 is formed with an annular groove 28 and extending radially from this groove are a plurality of passages 29 which lead to the exterior of the body section 11. In one use of the valve mechanism of the present invention, the passages 29 communicate with an annular chamber 31 of a muffler 32 circumscribing the body member 10 and slidably movable thereon between alternate positions of adjustment. The chamber 31 of the muffler communicates by way of openings 33 to the atmosphere so that in the position of adjustment of the muffler shown in Figure 2 the passageway 25 of the piston communicates with the atmosphere by way of the transverse passage 26, annular groove 28, openings 29, chamber 31 and the openings 33.

As the chamber 31 of the muffler communicates with atmosphere it is now preferred to fill the chamber with some suitable material such as steel wool or the like to "deaden" the sound produced by the escape of the air under pressure into the chamber during use of the valve mechanism.

The body section 12 is formed with a radially extending passage 34 which communicates with the bore 14 and the outer end of this passage is tapped to permit mounting of an outlet pipe 35 which leads to the air motivated device to be controlled and which may comprise the cylinder of the fluid motor of the sway device carried by the lift.

With the piston 22 in the position shown in Figure 2 the fluid motor or cylinder assembly is flow connected with the atmosphere by way of the pipe 35, bore 14, bore 13, passages 27, passages 26, annular groove 28, passages 29, and the chamber 31 of the muffler 32. In this position of the piston 22, it will therefore be seen that atmospheric pressure is acting against the lower face of the piston 22 as viewed in Figure 2.

If air under pressure is now introduced into the bore 16 from the pressure source, the pressure acting against the apex region of the conical face 23 closing the port 18 will urge the piston 22 downwardly in the cylinder toward the position of the piston shown in Figure 1. Once the piston 22 begins its downward movement and the apex region of the conical face moves out of the port 18, air under pressure will flow into the upper end of the cylinder and through the passages 24 into the longitudinal passage 25 leading to the passages 26 communicating with the passages 27 opening into the lower face of the piston 22. Air will thus flow into opposite end of the cylinder and into the blind bore 14, which is connected by the pipe 35 to the fluid motor. Although air will flow through the interconnected passages of the piston as soon as the piston commences its downward movement, the pressure of the air then acting against the conical face will, nevertheless, move the piston to a position in which the lower end face is engaged with an annular shoulder 30 preferably formed by recessing the counter bore in the body section 12. As the lower face of the piston is engaged with the shoulder 30, the latter will space the end face of the piston away from the wall of the cylinder so that this end face is subjected to the pressure of the air in the lower end of the cylinder and bore 14.

With the fluid motor now flow connected to the pressure source as above explained, pressure throughout the entire system will soon equalize. As the upper end of the piston 22 is smaller in diameter than the lower end, the lower face of the piston presents a larger area than the conical face 23. Thus the differential of the total force produced by the pressure of the system is sufficient to raise the piston in the cylinder formed by the bore 13.

As the piston 22 is raised in the cylinder, the lateral passages 26 will move into registry with the annular groove 28, which, as above explained, communicates with the atmosphere by way of the passages 29, chamber 31, and openings 33. This results, as should now be understood, in reduction of the pressure of the air in the lower end of the cylinder and fluid motor to atmospheric pressure and the fluid motor is deactivated. At this time, however, the piston 22 has again moved into the position shown in Figure 2, and the pressure of the air in the bore 16 acting against the apex region of the piston 22 closing the port 18 again forces the piston downwardly to the position shown in Figure 1.

Once the piston moves into the position shown in Figure 1, the pressure will once again equalize throughout the system, as above explained, and the resultant return movement of the piston initiates another cycle of operation. It will thus be seen that so long as the muffler 32 is in the position shown in Figure 2, the valve mechanism of the present invention will automatically fill and then exhaust a fluid motor or similar device connected to the valve mechanism by way of the pipe 35.

To increase the efficiency of the valve mechanism the piston 22 carries an O-ring 36 carried by an annular groove formed in the exterior wall of the piston. The O-ring 36 acts to seal the annular clearance between the piston 22 and the interior cylindrical surface of the bore 13. To augment the seal of the O-ring 36, an O-ring 37 is carried by an annular groove formed in the wall of the counter bore of the body section 11 and this O-ring engages, as is clearly shown in the drawing, the larger diametered section of the piston 22 as the piston is reciprocatably moved in the cylinder.

To seal the annular passage between the muffler 32 and the body 10 it is now preferred to mount an O-ring 38 in an annular groove formed in the exterior wall of the body section 11 and a similar O-ring 39 in an annular groove formed in the internal wall surface of the muffler 32. It will be noted that the O-rings 38 and 39 are so mounted in their respective grooves that air is is prevented from escaping from the cylinder throughout the annular groove 28 and passages 29 when the muffler 32 is occupying the position shown in Figure 1. This is so for in this position of the muffler the O-rings 38 and 39 are disposed on opposite sides of the outer ends of the passages 29.

As above explained, the muffler 32 is slidably mounted to the body 10 and in the position of the muffler shown in Figure 1 the chamber 31 no longer communicates with the cylinder formed by the bore 13. In the functioning of the valve mechanism with the muffler 32 in the position shown in Figure 1, the pressure of the air acting downwardly through the opening 18 will again move the piston 22 to its lowermost position in the cylinder to bring about equalization of the pressures acting against the opposite end faces of the piston 22. Here, however, the resultant return movement of the piston will not vent the cylinder as the lateral passage 26 moves into registry with the annular groove 28. Thus in this position of adjustment of the muffler there would be no automatic cycling by the valve mechanism and the piston of the fluid motor would be moved to its limit position under the air pressure and would remain in this limit position until the muffler was again moved to the position shown in Figure 2 to bring about the venting of the fluid motor as hereinabove explained.

Where the valve mechanism of the present invention is used with a rocker or sway device of the type hereinbefore described, the fluid motor or air cylinder of the rocker device, with the muffler 32 in the position of Figure 1, would act merely as a jack for raising the motor vehicle from the rails of the lift. This would allow the weight to be taken from the springs of the motor vehicle undergoing lubrication for a time sufficient for the mechanic to thoroughly inspect and lubricate the springs or other support mechanisms of the motor vehicle.

When it was desired to again support the vehicle by its own wheels on the rails of the lift, the muffler 32 would be merely moved upwardly to the limit established by the stop pin 41 to position muffler as shown in Figure 2. Once the muffler was moved into this position, the cylinder would be vented to atmosphere, and, so long as air under pressure was continued to be supplied to the bore 16 the valve mechanism would repeat the cyclic operation above described.

Although the valve mechanism of the present invention is particularly adapted for use with a rocker or sway device of a hydraulic lift, it is not limited to that use for it can be used in any field in which an intermittent supply of air under pressure is required to periodically operate an air cylinder or fluid motor.

The valve mechanism of the present invention, as the piston 22 will automatically control its own movement within the cylinder, brings about an automatic cycling in the one position of the muffler without the necessity of any spring operated mechanisms common in prior valves of this type. As no spring operated mechanisms are required, the service life of the valve herein shown is greater than otherwise could be expected if such mechanisms were employed to produce the cyclic movement of the piston.

Although the now preferred embodiment of the present invention has been shown and described herein, it is to be understood that the invention is not to be limited thereto, for it is susceptible to changes in form and detail within the scope of the appended claims.

I claim:

1. A self-cycling and automatically closing valve, comprising: means defining a substantially enclosed space for passing pressure fluid through the valve; a member reciprocatably mounted coaxially in said space; said member having at least one longitudinal passageway therethrough and the area of that end-surface thereof that lies adjacent the inlet end-portion of said space being less than the area of the opposite end-surface of said member; normally closed pressure fluid inlet means in the first-said end surface occasionally communicable with said longitudinal passageway; pressure-fluid outlet means in the opposite end-portion of said elongate space and communicating with the opposite end of the longitudinal passageway; means in said reciprocatable member and in said space-defining means adapted to be mutually registered to define an exhaust passageway extending laterally in said valve; and auxiliary valve-means movably mounted on said space-defining means and adapted to alternately lie out of registry with, and in registry with, said exhaust passageway so as to alternately effect unidirectional flow through the valve followed by automatic shut-off; and to intermittently supply fluid through the valve to a point of usage followed by automatic cut-off as long as said auxiliary means register with said exhaust passageway.

2. A valve adapted for cyclic and continuous operations, comprising: a substantially centrally hollow body; means for admitting continuous-flow pressure fluid into the one end portion of said body and means for outletting pressure fluid continuously and intermittently from the opposite end portion of said body; reciprocatable closure means mounted coaxially in said hollow body; said closure means having a fluid passage extending substantially longitudinally therethrough and communicable at its one end portion with said inlet means when the closure lies away from its upper stroke-limit, said closure means communicating at its opposite end portion with said outlet means; means defining in said body and in said closure means lateral exhaust means; and means slidably mounted on said body and adjustable to respectively close and open said lateral exhaust means thereby to respectively effect continuous uni-directional supply of pressure fluid through said valve to an extraneous fluid-using means and to effect intermittent, bi-directional flow of pressure fluid to said external means and from same to the ambient atmosphere.

3. A valve, comprising: means defining a substantially confined, hollow, elongate space; means for directing a pressure fluid thereinto; closure means mounted coaxially in the said space and reciprocatable for alternately enabling and disenabling flow of the fluid onwardly in the valve; said closure means including differential area surfaces at opposite ends thereof arranged to enable fluid pressure in the incoming direction to open the flow through said valve and to enable fluid pressure in the reverse direction to close said flow; means in said closure means and in the elongate-space defining means adapted to be registered upon closure of said flow to define lateral outlet means for the back-pressure fluid acting on said reciprocatable means; and means movably mounted on the exterior of said space-defining means and adapted to register with said lateral outlet means to exhaust said back-pressure and enable the incoming fluid to move said reciprocatable means against said back-pressure and open up flow through the valve thus to cyclically supply pressure fluid to an external connection.

4. A self-cycling valve, comprising: a substantially hollow body having a pressure fluid inlet and outlet disposed respectively at opposite end portions thereof; a perforate septum extending across the inlet end-portion of the hollow body; an annular shoulder disposed at the opposite end of the body; a longitudinally and laterally perforate closure member for said perforate septum movably mounted coaxially in the hollow body and having an upper imperforate face-portion adapted to close the perforation in said septum, said face having passages adapted to pass pressure fluid therethrough to said outlet even when the closure is resting on said annular shoulder; means extending laterally through said body and corresponding means extending laterally in said movable closure and adapted to mutually register to define an exhaust passage from said valve to ambient atmosphere; and means slidably mounted on said body and so movable with respect to said exhaust outlet as to alternately register with and open said outlet and to de-register and close said outlet thereby alternately to effect cyclic and continuous feed of pressure fluid to an external point of usage.

5. A self-cycling valve, comprising: means defining a hollow, elongate space; means in the opposite end portions of the first said means respectively defining an inlet and an outlet for a pressure fluid; a substantially hollow, longitudinally and laterally perforate closure member movably mounted coaxially in said hollow, elongate space and adapted to be moved solely by fluid pressure to alternately close and open said inlet means, the surface of said member adjacent said inlet means having a lesser area than the opposite surface and adapted to be reciprocated by the incoming fluid from a first position in which it lies at the one end portion of said hollow space to a position in which it allows the fluid pressure to equalize in the system, said closure member being adapted to be reciprocated to a second position by the pressure differential between the pressure on said adjacent surface and the pressure on said opposite surface; means extending laterally through said body and adapted to be registered with the lateral perforations in said closure member so as to define an exhaust passage from said valve to ambient atmosphere; and means slidably mounted on said body and so movable with respect to said exhaust passage as to register therewith and effect exhaust therethrough, thereby to effect reciprocation of said closure member and to cycle the flow through the valve; and alternately to de-register therewith and effect continuous flow connection through the valve.

6. A mechanism for intermittently supplying a pressure fluid to a fluid motor, comprising: a body having pressure fluid inlet means and outlet means therein; a bore extending longitudinally in said body; an inlet chamber located at the one end portion of said body and communicating with said inlet and with the one end of said bore; an outlet chamber located at the opposite end portion of said body and communicating with the opposite end-portion of said bore and with said outlet; a substantially hollow piston slidably mounted coaxially in said bore and having means at its one end portion for communicating with said inlet chamber and having means at its opposite end portion for communicating with said outlet chamber; means on the first said end-portion of said piston for closing communication between said inlet chamber and said piston; means in said opposite end portion of said body for preventing closure of communication between said piston and said outlet chamber; means disposed intermediate the end portions of said piston and means disposed in the circumscribing portion of said body, said means being mutually arranged to define an exhaust outlet from said outlet chamber through said piston and body to ambient atmosphere; and means slidably mounted on said body and so movable with respect to said exhaust outlet as to alternately register with and open said exhaust outlet and close said outlet thereby to respectively effect intermittent, bi-directional flow of pressure fluid to said fluid-motor and of circumambient air onto the bottom of said piston; and alternately to effect continuous uni-directional flow of fluid through said mechanism to said fluid motor, whereby to both intermittently and continuously activate said fluid motor.

7. A self-cycling and automatically closing valve, comprising: a body; means defining a substantially enclosed space extending longitudinally in said body for passing fluid through the valve; a piston movably mounted coaxially in said space; said piston having at least one passage extending longitudinally therethrough, the area of the end-surface of said piston that lies adjacent the valve-inlet means being less than the area of the opposite end-surface of said member; normally closed pressure-fluid inlet means in the first said end surface occasionally communicable with said longitudinal passageway; pressure-fluid outlet means in the opposite end-portion of said body and communicating with said opposite end of said longitudinal passageway; laterally extending passageways in said opposite end portion of said piston; corresponding laterally extending passageways in said body adapted to be registered with the first said lateral passageway to define exhaust means for venting from the valve fluid pressure acting on the said opposite end-portion of said piston; and muffler means movably mounted on said body and adapted to alternately lie out of effective registry with and in effective registry with said exhaust means so as to alternately prevent exhaust of fluid from said valve thereby to effect uni-directional flow from the valve terminated by automatic shut-off of the valve; and to intermittently supply fluid through the valve to a point of usage, terminated by automatic shut-off of the valve.

8. In a pressure-fluid controlling valve that includes a body containing a piston reciprocatable therein to close and open a pressure-fluid inlet thereinto; means defining a lateral exhaust path in said piston; means in said body registerable with said path for outletting the exhaust from said body; and an annular member movably mounted on said body and having a flow-path registerable with the exhaust means in said body in the one position of said annular member for exhausting fluid from the lower portion of said body so as to cycle the valve to intermittently pass fluid, said annular member being movable out of registry with said exhaust-outletting means so as to block exit of pressure fluid from said body through said exhaust means thereby to effect continuous flow through said valve terminated by closing of said inlet means by said piston.

References Cited in the file of this patent

UNITED STATES PATENTS

| | | |
|---|---|---|
| 2,029,145 | Wilson et al. | Jan. 28, 1936 |
| 2,559,541 | Martin | July 3, 1951 |
| 2,665,704 | Kanuch | Jan. 12, 1954 |